United States Patent
Beckmann et al.

(10) Patent No.: US 12,548,212 B2
(45) Date of Patent: Feb. 10, 2026

(54) METHOD OF CONVERTING TIME SERIES DATA INTO AN IMAGE

(71) Applicant: Siemens Energy Global GmbH & Co. KG, Bayern (DE)

(72) Inventors: Björn Beckmann, Duisburg (DE); Phani Nandula, Andhrapradesh (IN); Johannes Steiner, Berlin (DE)

(73) Assignee: Siemens Energy Global GmbH & Co. KG, Bayern (DE)

(*) Notice: Subject to any disclaimer, the term of this patent is extended or adjusted under 35 U.S.C. 154(b) by 114 days.

(21) Appl. No.: 17/923,590

(22) PCT Filed: May 12, 2021

(86) PCT No.: PCT/EP2021/062671
§ 371 (c)(1),
(2) Date: Nov. 6, 2022

(87) PCT Pub. No.: WO2021/228966
PCT Pub. Date: Nov. 18, 2021

(65) Prior Publication Data
US 2023/0196638 A1    Jun. 22, 2023

(30) Foreign Application Priority Data
May 14, 2020 (IN) .............................. 202011020463

(51) Int. Cl.
*G06T 11/00* (2006.01)
*G06T 5/50* (2006.01)
(Continued)

(52) U.S. Cl.
CPC .............. *G06T 11/001* (2013.01); *G06T 5/50* (2013.01); *G06T 7/0004* (2013.01);
(Continued)

(58) Field of Classification Search
CPC ....... G06T 11/001; G06T 5/50; G06T 7/0004; G06T 2207/20084; G06T 2207/20224; G06T 2207/30164; G06V 10/761
See application file for complete search history.

(56) References Cited

U.S. PATENT DOCUMENTS

2012/0262472 A1* 10/2012 Garr ...................... G06T 11/206
345/589
2017/0032550 A1   2/2017 Vander Broek
(Continued)

OTHER PUBLICATIONS

Stetco, Adrian, et al. "Machine learning methods for wind turbine condition monitoring: A review." Renewable energy 133 (2019): 620-635. (Year: 2019).*
(Continued)

*Primary Examiner* — Xin Sheng
(74) *Attorney, Agent, or Firm* — Wolter Van Dyke Davis, PLLC

(57) ABSTRACT

A computer-implemented method of converting time series data of at least one operational data source of a technical system into an image, includes providing a time series data of at least one operational data source of the technical system as a series of values of successive time stamps, wherein the values of the series of values vary over time. The method further includes the steps of assigning for each of the considered time stamps of the respective time series data either a value-depending color, a value-depending brightness, a value-depending pattern or a combination thereof to an image element of the image, and sequencing the image elements along a timeline, preferably without spaces between the image elements, to form for each time series data a set of linearly arranged image elements of the image.

12 Claims, 6 Drawing Sheets

(51) Int. Cl.
    *G06T 7/00* (2017.01)
    *G06V 10/74* (2022.01)
(52) U.S. Cl.
    CPC .. *G06V 10/761* (2022.01); *G06T 2207/20084* (2013.01); *G06T 2207/20224* (2013.01); *G06T 2207/30164* (2013.01)

(56) References Cited

U.S. PATENT DOCUMENTS

| | | | |
|---|---|---|---|
| 2019/0065848 A1* | 2/2019 | Borrel | G06T 11/00 |
| 2019/0114351 A1 | 4/2019 | Mineev | |
| 2019/0171187 A1* | 6/2019 | Cella | G06N 3/126 |

OTHER PUBLICATIONS

Ray, Ronald J., John W. Hicks, and Keith D. Wichman. Real-time in-flight engine performance and health monitoring techniques for flight research application. No. NASA-TM-104239. 1991. (Year: 1991).*

PCT International Search Report and Written Opinion of International Searching Authority mailed Sep. 22, 2021 corresponding to PCT International Application No. PCT/EP2021/062671 filed May 12, 2021.

Shorten et al., "A survey on Image Data Augmentation for Deep Learning", Journal of Big Data, 2019, 6:60; https://doi.org/10.1186/s40537-019-0197-0.

Hatami, Nima, et al. "Classification of time-series images using deep convolutional neural networks." Tenth International conference on machine vision (ICMV 2017). vol. 10696. SPIE, 2018.

Zheng, Yi, et al. "Time series classification using multi-channels deep convolutional neural networks." International conference on web-age information management. Springer, Cham, 2014.

Fawaz, Hassan Ismail, et al. "Deep learning for time series classification: a review." Data mining and knowledge discovery 33.4 (2019): 917-963.

Wang, Zhiguang, et al. "Encoding time series as images for visual inspection and classification using tiled convolutional neural networks." Workshops at the twenty-ninth AAAI conference on artificial intelligence. 2015.

Suematsu, Haruka, et al. "A heatmap-based time-varying multivariate data visualization unifying numeric and categorical variables." 2014 18th International Conference on Information Visualisation. IEEE, 2014 (pp. 84-87) XP032647014.

Cui, Zhicheng, et al. "Multi-scale convolutional neural networks for time series classification." arXiv preprint arXiv:1603.06995; 2016.

Cerliani, Marco "Remaining Life Estimation with Keras" Towards Data Science, 2019, accessed Nov. 3, 2022 at https://towardsdatascience.com/remaining-life-estimation-with-keras-2334514f9c61.

Du, Shengdong, et al., "Multivariante time series forecasting via attention-based encoder-decoder framework"; Neurocomputing, Elsevier, Amsterdam, NL, vol. 388, Jan. 15, 2020 (Jan. 15, 2020), pp. 269-279, XP086097939.

* cited by examiner

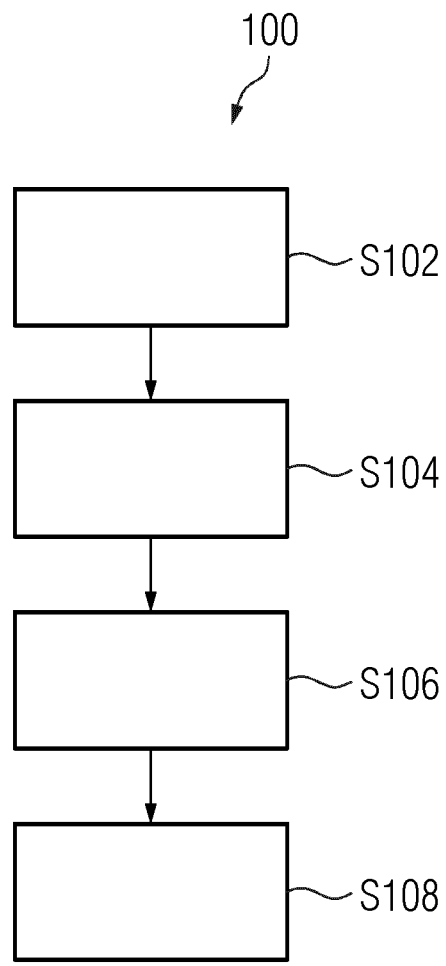

METHOD OF CONVERTING TIME SERIES DATA INTO AN IMAGE

CROSS REFERENCE TO RELATED APPLICATIONS

This application is the US National Stage of International Application No. PCT/EP2021/062671 filed 12 May 2021, and claims the benefit thereof. The International Application claims the benefit of Indian Application No. IN 202011020463 filed 14 May 2020. All of the applications are incorporated by reference herein in their entirety.

FIELD OF THE INVENTION

The present invention relates to a computer-implemented method of converting time series data of at least one operational data source of a technical system into an image.

BACKGROUND TO THE INVENTION

Nowadays complex technical systems like machines, turbines, buildings, etc. are monitored with the aid of a large set of sensors that generates continuously an enormous amount of data during the operation of the respective technical system. Because of the complexity of the technical system and its dependency from a high number of influencing effects the determination of the present condition of said system is rather difficult and usually done from a kind of automated monitoring systems using different conventional and artificial approaches.

Furthermore, multi-variate time series sensor data often contain a) temporal dependencies that cause two otherwise identical time stamps to belong to different classes or predict different behaviour, b) spatial dependencies which—caused by a change in one sensor data—have an impact on other sensor data, too, wherein the relationship is complex in nature. This characteristic generally increases the difficulty of analysing multi-variate time series data.

Hence, anomaly detection for determining an erroneous status of the system using multi-variate time series sensor data is a challenging task, as there can be many sources for anomaly. There may be several combinations of multi-dimensional sensor data showing an anomaly that is caused by predictable or non-predictable situations generating expected, i.e. consistent and/or not expected, i.e. inconsistent data.

Currently, the problem of anomaly detection is addressed by a considerably number of different approaches. Besides rule-based approaches, domain expertise, conversion of time series data of a sensor into an image and then applying machine learning (ML) techniques such as CNN, LSTM are known, to list only a few of them.

Especially, when time series data of one sensor is encoded as an image, analyzing features are hand-engineered using some domain knowledge and then fed into the deep learning discriminative classifier. For example: Gramian Angular field (GAF), is used to represent time series in a polar coordinate system instead of the typical cartesian coordinates. Limitations of these approaches include a) transformation of data reduces the interpretability of results, it's hard to find the actual source of the anomalies and b) these feature extraction methods are not domain agnostic. Domain agnostic mean, that the interpretation and usage of the time series data need domain specific background information.

In addition, datasets may be very limited which poses a considerable challenge when analysing these datasets using deep learning techniques. It is also known that data augmentation is a data-space solution to the problem of limited data. Data augmentation encompasses a suite of techniques that enhance the size and quality of training datasets such that better Deep Learning (DL) models can be built using them. The image augmentation algorithms include geometric transformations, colour space augmentations, kernel filters, mixing images, random erasing, feature space augmentation, adversarial training, generative adversarial networks, neural style transfer, and meta-learning.

Unfortunately, the modifications mentioned above cannot be used when dealing with industrial datasets or sensor-based data. In industrial or sensor-based data, if any modification as mentioned above are made, either physics-based relationships are lost, or no new information is added to the existing dataset. The intent with for applying deep learning models is not only to capture patterns from the images but also to capture the underlying physics-based relationships.

Therefore, better approaches that would be applicable for sensor-based datasets are required. In this environment, the issues of handling multi-variate time series sensor data or sparse data are addressed considering anomalies in the data and the sources that caused these anomalies. For these reasons the classification of multi-variate time series data is an important and challenging problem.

This results in the need for a new method for the analysation of multi-variate time series data of a technical system or its operation for identifying anomalies in the data indicating an erroneous or not predicted status.

SUMMARY OF INVENTION

It is a first objective of the invention to provide an improved method for the analyzation of data time series that enables an easy and fast analysis based on already existing AI- or ML-techniques.

It is a second objective of the invention to provide an improved method for the analyzation of data time series that suffer under sparse data.

It is a third objective of the invention to provide a method for generating additional datasets of multi-variate time series data.

Accordingly, the present invention provides a computer-implemented method of converting time series data of at least one operational data source of a technical system into an image, the method comprising the steps of: a) providing the time series data of at least one operational data source of the technical system as a series of values of successive time stamps, wherein the values of the series of values vary over time, b) assigning for each of the considered time stamps of the respective time series data either a value-depending colour, a value-depending brightness, a value-depending pattern or a combination thereof to a time stamp related image element of the image, c) sequencing the image elements of the considered time stamps of the respective time series data along a timeline, preferably without spaces between the image elements, to form for each time series data a set of linearly arranged image elements of the image.

The inventors propose a new graphical appearance for the time series data. Instead of conventional appearance of a time series data as a curve over time in a chart, now it is proposed to convert the present value into a valued—depending colour, a valued—depending brightness, value—depending pattern or a combination thereof and to sequence the individual colours, brightness and/or pattern as a straight line. This new approach of a graphical representation of time series data in form of an 1D image facilitates a high-density information display type, which is easier to analyse from computer aided systems.

Due to the inventive matter already existing methods for image analysing and image interpretation can be applied although these methods were originally not intended for the analyzation industrial datasets generated by a technical system. Deep learning models can automatically detect the features, resulting in no manual bias. Further, the new methods are domain agnostic and provides a simple model, which can be extended to find sources of an anomaly, improving the explained ability of the black box model. Also, like models can be utilized for the analyzation of the image, which need not require a high computational power, and which can be developed and run on a rather simple hardware.

The methods described herein can be effectively used for analysing problems that involve multi-variate time series sensor data, where a need exists to analyse all the sensor data to understand the state of the technical system rather than individual particular operational time series data.

It is noted that the step of assigning could be understood as a step of calculating or determining. This mean, that a code representing the individual colour or the like, can be either calculated by the method instantly for the present value of the time series data according to a predefined transformation calculation. Or a converting table in which predefined codes for the colour, brightness or the pattern can be selected for the present value of the time series data.

The inventive method can be executed instantly during the operation of the technical system. However, also historical time series data that are stored in an appropriate database could be converted according to the method for generating second images of multi-variate time series data.

Finally, this solution can be combined with interpretable machine learning techniques to effectively understand the reason for machine learning predictions, which would be valuable only for better understanding of technical system, especially for capturing the underlying physics-based relationships.

According to a preferred realisation of the invention a plurality of time series data is provided by a plurality of operational data sources, wherein for each of these pluralities of time series data an assignment according to step b) and a sequencing according to step c is performed, such, that for each provided time series data as operational data source a set of linearly arranged set of image elements is formed, wherein a next step all considered sets of linearly arranged image elements for a given period are stored in one image by one are arranged within the image next to each other, preferable without spaces therebetween and without offset.

This preferred embodiment enables the simultaneous analysing of a plurality of time series data by one of the deep learning models, artificial intelligence (AI) method or the like mentioned in this application. Further, correlation or interrelationships across different operational data sources can be identified and specific patterns of the image could be captured more easily, not only for a single time stamp, but also across time.

According to a further aspect of the invention the image is arranged within a cartesian coordination system, in such a way, that the sets of linearly arranged image elements are arranged parallel to the X-axis of the cartesian coordination system and the sets of linearly arranged image elements are stacked along the Y-axis next to each other, preferably without any spacing and/or offset.

According to this preferred embodiment all the information contained in the plurality of operational time series data for a given period are stored in one image. This enables the improved evaluation of interrelationships between different operational time series data both spatially i.e. along (vertical) Y-direction of image and time domain i.e. along (horizontal) X-axis and gives more information about where exactly the anomaly is and how is it varying in the time domain.

In a further realisation of the invention at least one operational data source representing an operational parameter is or was read by a sensor, the operational parameter represents a position of a valve, a drive or an moveable element, a fraction of an element or a molecule in a gaseous or liquid medium, a pressure of a medium, a temperature of a medium, a humidity of a medium, a flow rate of a medium, a voltage or an electrical current or the like of a technical system.

According to an advantageous embodiment of the invention the sensor is generating the time series data continuously or stepwise.

In a further advantageous embodiment, when a colour or a brightness is assigned to the image element, each image element comprise multiple pixels of the image arranged in form of a square or rectangle or only one pixel of the image, or when a pattern is assigned to the image element, each image element comprises multiple pixels of the image arranged in form of a square or rectangle.

Accordingly, the size of the image element representing an individual value of the operational data for the individual time stamp can be selected arbitrarily. The smallest possible solution for the image element to achieve a smallest image size is the utilization of only one pixel each the image element. Larger images are achieved, if the image element of an image comprises a plurality of pixels, all the pixels relating to the same image element are arranged as a square or rectangle. To form the set of image elements, they can be arranged easily along a straight line and/or within a cartesian coordination system. It is obvious, that all image elements within the image shall have the same size. However, in specific applications it could make sense, that the vertical sizes of the image element of different operational time series data are different. This could be beneficial, if for selected or specific operational data sources different importance shall be assigned for weighting them differently. Also, in this case the horizontally size of the image elements for different operational data sources should be identical. Horizontally identical mean that the time period considered for the individual time stamp are for all of the multiple operational time series data (sources) identical.

According to an advantageous embodiment of the invention a difference image is generated by a comparison of the image with a second image, especially for generating new images as training data or, when an abnormal status is identified or the generation or the provision of values of the respective time series data are interrupted or after such an interruption.

The utilization of difference images creates a specific benefit according to the number of images needed for machine learning methods. Through the generation of difference images, the number of total images and therefore the number of datasets can be significantly increased within a smaller period. In example, through the generation of difference images, when just three original images exist, the total number of images can be doubled. Hence, the time needed for the generation of a significant number of images/datasets for a sufficient training the machine learning methods can be reduced. Also, the machine learning result can be improved so that pattern of failure or abnormal operational status can be determined faster and with improved accuracy. Further, when an abnormal status is identified or the generation or the provision of values of the respective time series data are interrupted or after such an interruption, lack of data can be compensated. This mean that in case of sparse data subtraction of images helps to overcome this problem.

According to an advantageous embodiment of the invention method further comprises the step of analysing the image or the difference image, by any one or more methods from the group comprising neural networks, machine learning methods, deep learning methods, image artificial intelligence algorithm.

In a further realisation of the invention the method is applied for monitoring the condition of any rotating equipment during its operation.

The utilization of the inventive method is especially very beneficial for monitoring the condition of any rotating equipment, especially for turbo-engines during its operation. This mean that the technical system is embodied as a rotating equipment, especially a turbo-engine. Especially for this type of technical system and an enormous amount of time series data of a very large number of operational parameters are generated continuously during operation time. As the interaction of the different operational parameters are very complex due to aerodynamically phenomena within the compressor and the turbine and/or within the combustion flame, a reliable analysis of the present status of the rotating equipment and its operation was very hard to analyse and to achieve. With the aid of the new method a new approach is available through which the enormous amount of data can be analysed with rather conventional computer systems within an acceptable period. As a result, for this type of technical systems the proposed method provides extraordinary benefit as a better understanding of the rotating equipment is possible, especially for capturing the underlying physics-based relationships.

In a further realisation of the invention the method is applied for identifying the condition monitoring of other types of engines, for estimating quality in process industries, for anomaly detection in industrial assets, for forecasting of failures, for trend deviations, for cyber security or the like.

The present invention also provides a data processing apparatus like conventional computers comprising means for carrying out the steps of the methods of any of the above-described embodiments.

In a further aspect of the invention a computer program product comprising instructions is provided, which, when the program is executed by a computer, cause the computer to carry out the steps of the methods of any of the above-described embodiments.

The present invention also provides a computer-readable storage medium comprising instructions which, when executed by a computer, cause the computer to carry out the steps of the methods of any of the above-described embodiments. Preferably, the computer-readable storage medium is a non-transitory computer-readable storage medium, e.g. a computer memory, a hard drive disk, a compact disk, an USB-Memory-Device, a cloud-storage or the like for storing the computer program durably.

The previously given description of advantageous embodiments of the invention contains numerous features which are partially combined with one another in the dependent claims. Expediently, these features can also be considered individually and be combined with one another into further suitable combinations. Furthermore, features of the method, formulated as apparatus features, may be considered as features of the assembly and, accordingly, features of the assembly, formulated as process features, may be considered as features of the method.

The above-described characteristics, features and advantages of the invention and the manner in which they are achieved can be understood more clearly in connection with the following description of exemplary embodiments which will be explained with reference to the drawings. The exemplary embodiments are intended to illustrate the invention but are not supposed to restrict the scope of the invention to combinations of features given therein, neither regarding functional features. Furthermore, suitable features of each of the exemplary embodiments can also be explicitly considered in isolation, be removed from one of the exemplary embodiments, be introduced into another of the exemplary embodiments and/or be combined with any of the appended claims.

BRIEF DESCRIPTION OF THE DRAWINGS

The present invention is further described hereinafter with reference to illustrated exemplary embodiments shown in the accompanying drawings, in which:

FIG. 8 shows the method step of generating a difference image and FIG. 9 shows a flow diagram of the inventive method.

DETAILED DESCRIPTION OF INVENTION

Figure 1:
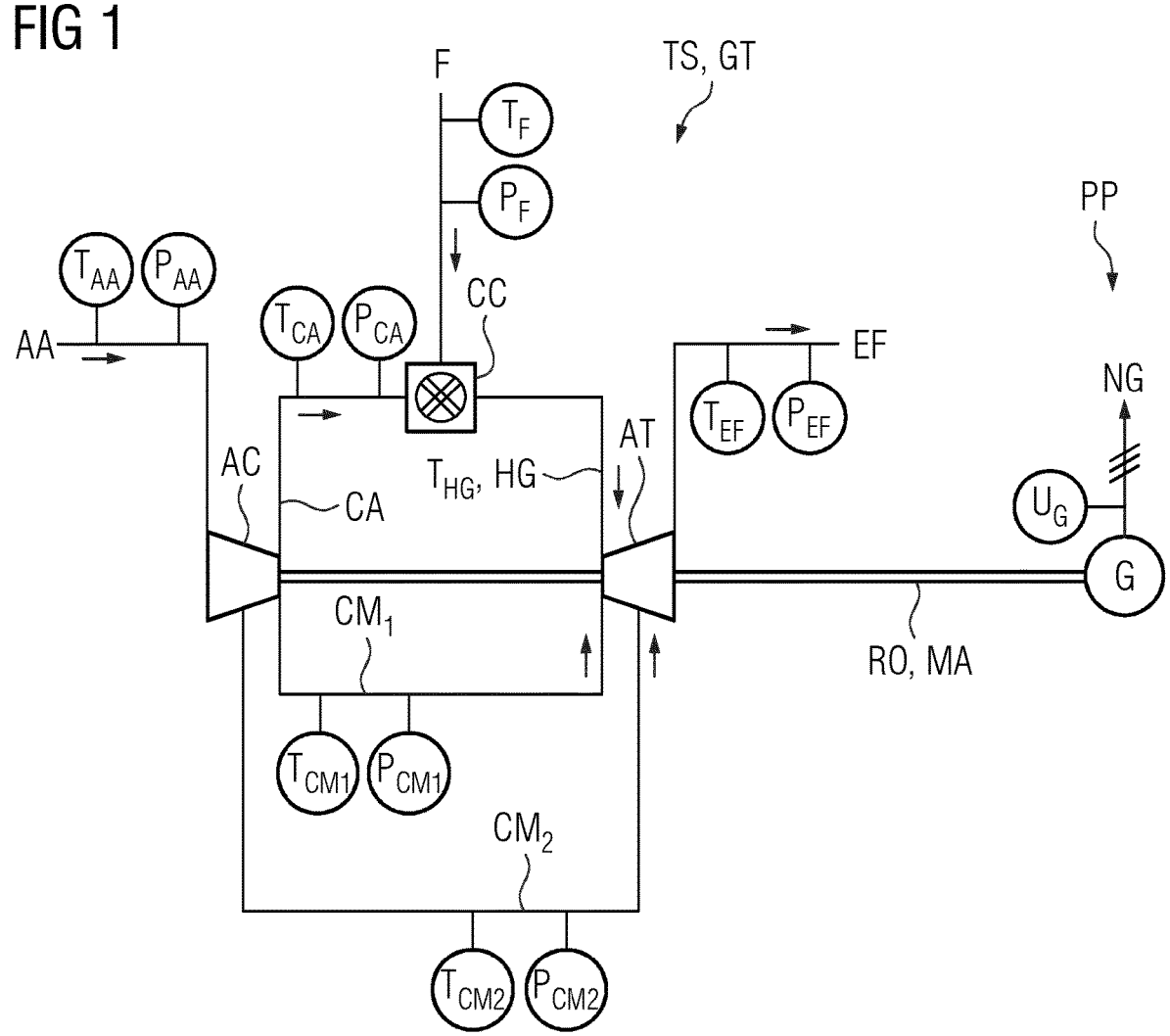
FIG. 1 shows a gas turbine as an exemplary embodiment of a technical system.

FIG. 1 shows schematically as an example of a technical system TS a large rotating equipment embodied a gas turbine GT. The gas turbine GT is of stationary type and part of the power plant PP for generating electrical energy by an electrical generator EG. Depending on the scope of the technical system that is monitor, also only the electrical generator EG or the complete power plant PP could be interpreted as a technical system TS.

The gas turbine GT is of conventional type and comprises along a machine axis MA an axial compressor AC, a combustion chamber CC and an axial turbine AT. Within the axial compressor AC and the axial turbine AT multiple compressor stages resp. turbine stages are arranged in a typical manner (not shown), each comprising a row of rotating blades and stationary vanes (also not shown). The rotor RO of the gas turbine GT is connected to the rotor of the electrical generator EG for transmitting torque from the gas turbine GT to the electrical generator EG. The electrical generator EG provides electrical energy to the electrical grid NG.

During operation of the gas turbine GT the axial compressor AC breath in ambient air AA. The ambient air AA is compressed by the compressor AC to a compressed air CA, which is forwarded to the combustion chamber CC. Here fuel F is added to the compressed air. The mixture of fuel F and compressed air CA is burned to a hot gas HG. The hot gas HG is guided to the inlet of the axial turbine AT. Within the axial turbine AT, the hot gas HG is expanded to an exhaust flue EF while driving the rotor RO of the gas turbine GT. The exhaust flue EF is either forwarded to a chimney or to and heat recovery steam generator (both not shown). A smaller part of the compressed air CA is forwarded to the axial turbine as cooling medium $CM_1$, $CM_2$ for cooling either or both combustion chamber part and turbine parts like blades and vanes. Meanwhile the electrical generator EG generates electrical energy which is feed into the electrical grid NG.

During operation of the gas turbine GT and the electrical generator EG a large number of operational parameters are monitored by individual, appropriate sensors for controlling the gas turbine GT according to the present requirements of the electrical grid NG and for ensuring safe and reliable operation of all components.

In this exemplary case, operational parameters represents as an example a temperature $T_{AA}$ of ambient air AA, a temperature $T_{CA}$ of compressed air CA, a temperature $T_F$ of the fuel F, a temperature $T_{HG}$ of the hot gas HG at the inlet of the axial turbine AT, a temperature $T_{EF}$ of the exhaust flue EF and temperatures $T_{CMx}$ of the cooling medium $CM_x$. The temperatures T are measured by appropriate temperature sensors. Further, pressures $P_{AA}$, $P_{CA}$, $P_F$, $P_{CMx}$, $P_{EF}$ of the fluids are monitored by appropriate pressure sensors, too. Of course, other temperatures or pressures could be measures also. Further, other properties of the fluids could be monitored, e.g. the humidity, or the composition of the fluids in regard to its chemical elements or molecules therein. Further, other operational parameters like the generated voltage $U_G$ of the electrical generator EG could be monitored and recorded also.

During monitoring the gas turbine GT, each sensor provides a stream of values of operational data for the monitored operational parameter. The values of the monitored operational parameter changes over time. In the following said stream of values is called time series data of an operational source or parameter. The time series data of operational data source is either provided in a first step S102 (FIG. 9) as raw data generated by the sensor directly or as modified data, in example raw data transformed by a FFT (Fast Fourier Transformation) or as scaled data. Any time series data are recorded and stored in an appropriate database (not shown).

Further, for operational parameters, which are essential for the reliable and safe operation of the gas turbine, not only a single sensor is utilized for the monitoring of the considered operational parameter. For each of this type of operational parameters several redundant sensors can be used for monitoring the same operational parameter at nearly the same position. In case of the latter, for the respective operational parameter either a) only one single time series data is provided, representing e.g. an average value of all sensors sensing the same operation parameter of the of the technical system or b) multiple time series data are provided in form of raw data or modified data of each sensors monitoring the same operational parameter.

Figure 2:
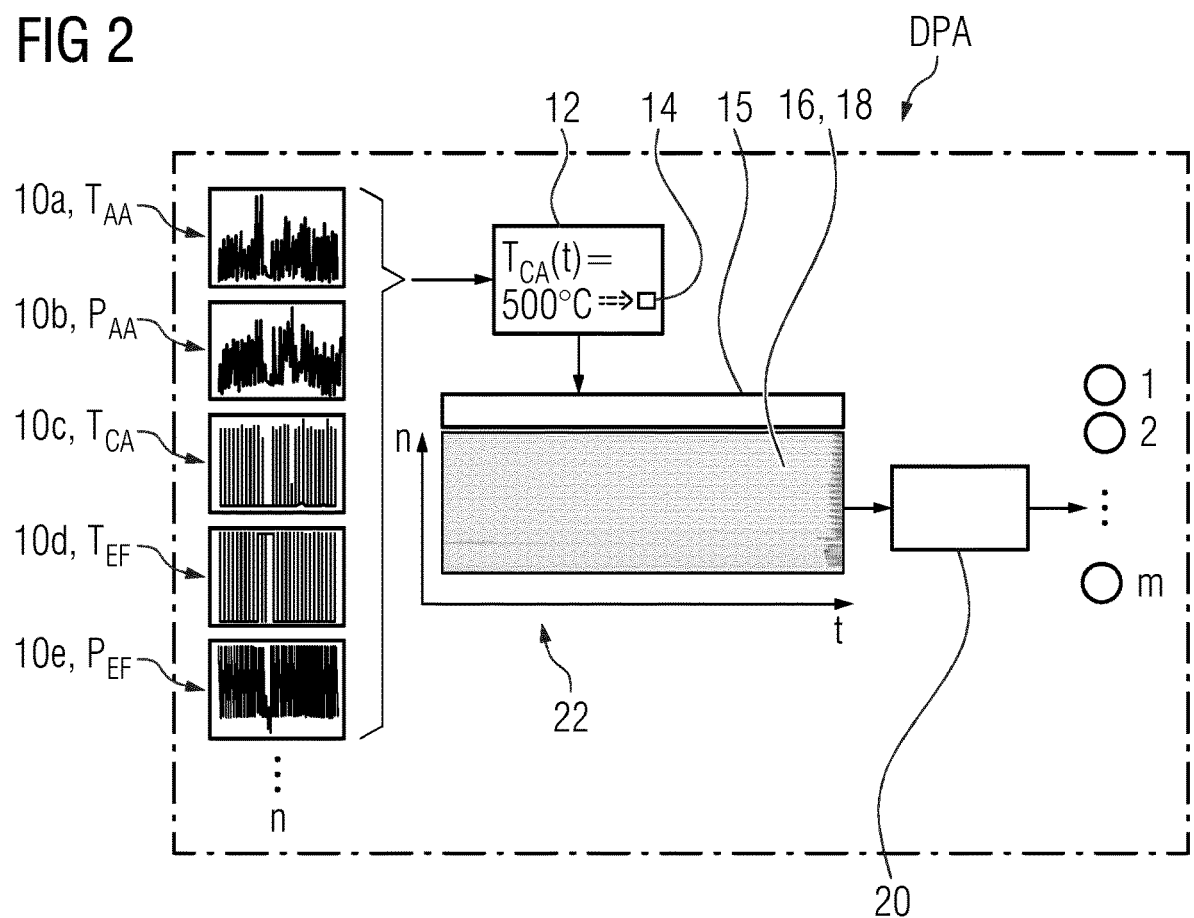
FIG. 2 shows a data processing apparatus according to an example of the invention.

FIG. 2 shows a data processing apparatus DPA, in which different means for carrying out the steps of the inventive method 100 (FIG. 9) are arranged. The starting point of the inventive method 100 comprises according to this example a number n of operational parameters, from which only five are shown in FIG. 2 in detail. Of course, the number of operational parameters 10 depends strongly need for the safe and secure operation of the technical systems being monitored.

According to the example of FIG. 2, a first operational parameter 10a represents the temperature $T_{AA}$ of the ambient air AA, a second operational parameter 10b represents the pressure $P_{AA}$ of the ambient air AA, a third (10c) represents the pressure $P_{CA}$ of the compressed air CA, and a fourth and the fifth operational parameters 10d, 10f represent the temperature $T_{EF}$ and the pressure $P_{EF}$ of the exhaust flue EF. In the appropriate charts the chronological sequence of the sensed values is displayed as conventional curve of time varying values.

According to the invention, the computer-implemented method of converting time series data into an image converts with the aid of a converting unit 12 the present value of each time series data of each operational parameter 10 into an image element 14. After the provision of the time series data, in a second step S104 for each operational parameter 10 the present value of the respective one time series data is converted into either a value-depending colour, value-depending brightness, a value-depending pattern or a combination thereof of into the image element. As time progresses, for each new time stamp, i.e. for each new value of the respective time series data a new image element is generated, containing again the present value in form of either a colour, a brightness, a pattern of a combination thereof. Former image elements and the present image element of the same time series data are sequenced in a third step S106, preferable without any spacing therebetween, along a straight line to a set 16 of image elements 14. Hence, this 1D-arrangement of time series data comprises the values of one operational parameter. Values of different time series data recorded at the same time stamp are converted in real time, not to say simultaneously by the converting unit, but in different sets.

In this exemplary embodiment, the values are converted by the converting unit 12 into in a range between white and black, especially in different shades of grey. Provided, the temperature of the −100° C. is represented by white image element and the temperature of 2000° C. by a black image element, the temperatures therebetween continuously change in shades of grey from white to black. According to FIG. 2, a temperature 500° C. is converted into a dark grey. Of course, each time series data can have their own definition for its image elements resp. sets of image elements.

In the subsequent step S108, all converted time series data, i.e. all sets 16 of image elements 14 are stacked by a composing unit 15 next each other, preferable without any spacing therebetween, whereby the complete image 18 is composed.

In FIG. 2, the image 18 is photography. Beneficially, the sets 16 of all considered operational parameters are arranged within a cartesian coordination system 22, such, that the different sets 16 are arranged parallel to the X-axis of the cartesian coordination system and stacked along the Y-axis next to each other. The stacking of the sets 16 is selected such, that all values of the operational parameters 10 recorded at the same time stamp are positioned in the same horizontal position, i.e. at the same position of the X-axis, without any offset. This overall arrangement of sets of individual image elements generates the image that incorporates present data and data of before of the gas turbine GT. With this 2D arrangement of image elements of multiple operational parameters resp. multi-variate time series data the image 18 is obtained, which contains the information about the respective values in form of a colour, a brightness, a pattern or a combination thereof.

The size of the image can be calculated by the number of time stamps multiplied by the number of sensors resp. time series data. Preferably, the image can vary, if a shifting time window of the monitored time series data is applied.

In a third step, an analysing unit 20 utilizes the image 18 by carrying known machine learning algorithms, either for training machine learning algorithms or artificial intelligence algorithms. Or, the analysing unit 20 utilises the image 18 for determining abnormal or erroneous status of the gas turbine during its operation.

If indicated and where appropriate, in an optional fourth step probability distribution over m classes can be done.

Figure 3:
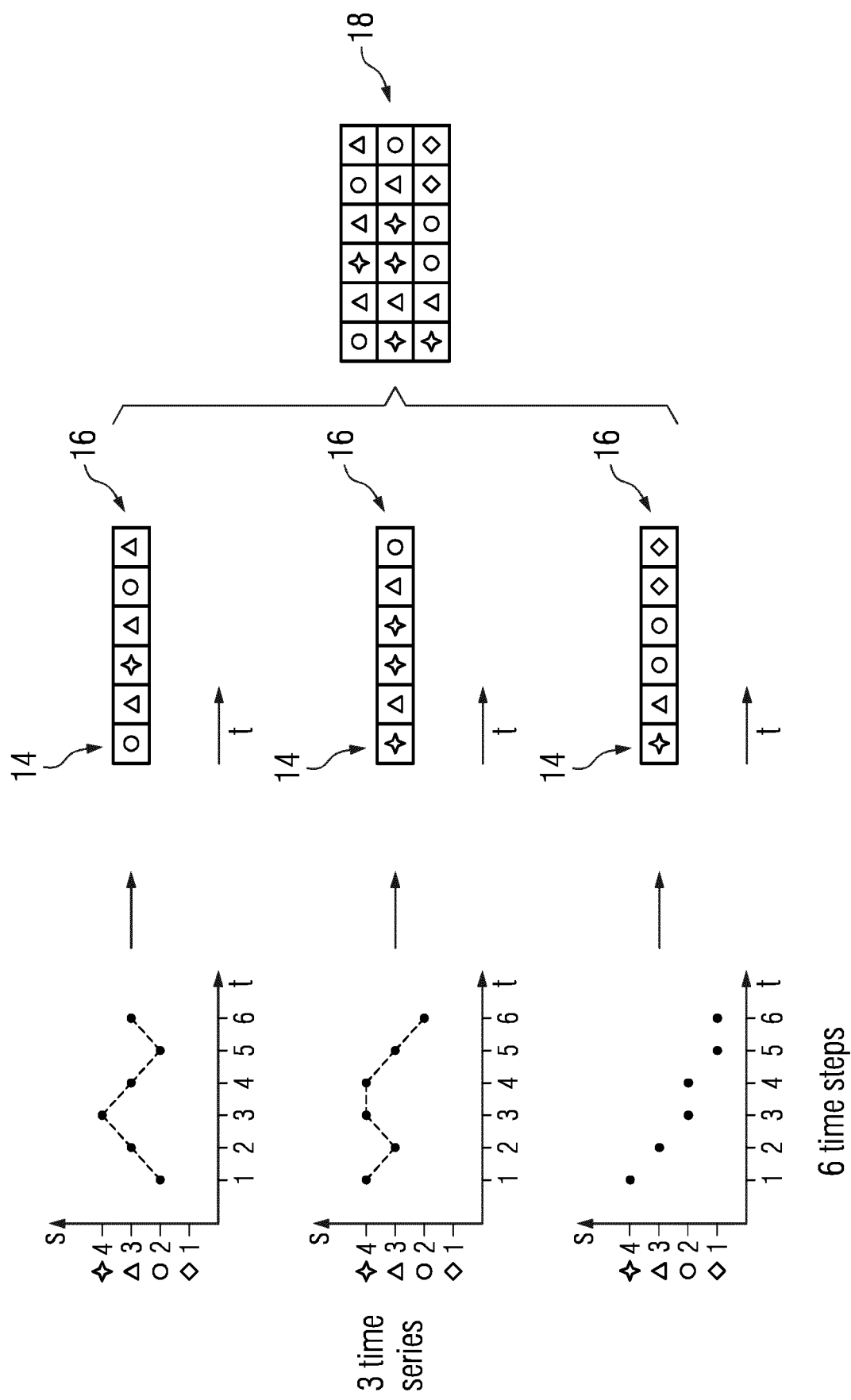
FIG. 3 shows the inventive data conversion in general.

FIG. 3 shows again the time series data conversion for three time series data each having 6-time steps. It is assumed that all values of the three parameters are in the range between 1 and 4. According to the method the values are represented by different pictograms in the image elements: the value of "1" is shown as rhomb, the value of "2" is shown as circle, the value of "3" is shown as a triangle and the value of "4" is shown as a star with four corners. With this, each image element 14 comprises a pattern and each set 16 of image elements 14 shows a sequence of different patterns, which are combined to the image 18 having a size 6×3 image elements in pattern style. Of course, the pictograms can also be understood as a representation of a colour: the rhomb could represent red, the circle could represent green, the triangle could represent yellow and the star could represent blue for creating a coloured image 18.

Figure 4:
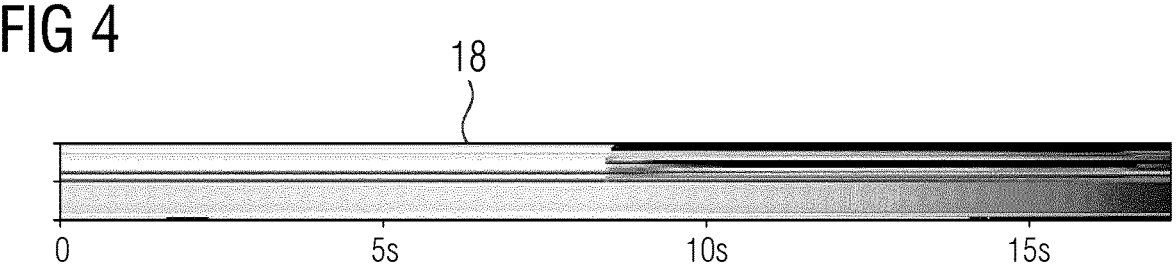
FIG. 4 is an image according to the invention.

FIG. 4 shows a photography of an image 18 that is generated according to the computer-implemented method of the invention. In the displayed multi-variate image data of forty uni-variate operational parameters are composed for a period of about approximately seventeen seconds. At the x-position of 9 s seconds an abnormal status of some of the multi-variate time series data is shown as in some of the lines the shades of grey of the respective time line fade not continuously, but rather stepwise.

Figure 5:
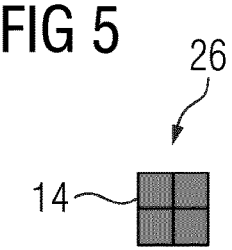
FIGS. 5-7 show different image elements.
Figure 6:
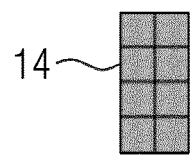
Figure 7:
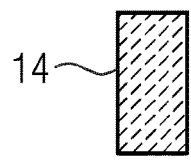

In FIGS. 5, 6 and 7 different types of image elements 14 are shown. While FIG. 5 shows an image element 14 comprising four pixels 26 with one shade of grey in a shape of a square, shows FIG. 6 the image element 14 comprising eight pixels 26, which all together form a rectangle. The image element 14 shown in FIG. 7 is composed by a higher number of pixels enabling the usage of a specific pattern—here a dotted pattern.

Figure 8:
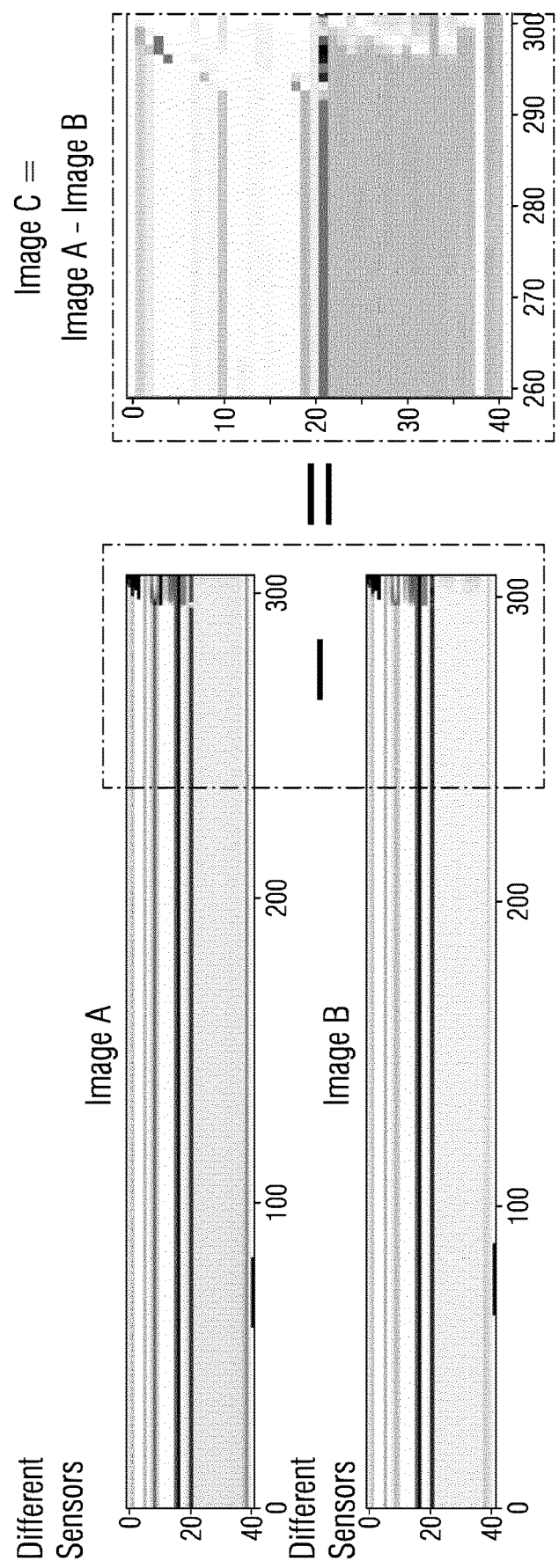

FIG. 8 shows two photography of two inventive images, image A and image B, generated according to the method as explained above for the same group of operational parameters of the same gas turbine GT. In this example, both images A, B contains different abnormal situations. Although the images A, B seem to be identical, they differ slightly in the range between X=280 and X=300. For generating new datasets that can be used also by machine learning algorithm or other methods, a difference image C (photography) is created by subtracting image B from image A. It is noted this subtraction operation could be done also by using one image, either image A or image B, in which only expected time series data resp. normal operation is recorded. Assumed that three images I1, I2 and I3 exists, the number of images can be double by subtractions the images from another: I4=I1−I2, I5=I1−I3 and I6=I2−I3, independently, if the one image, two images or all of the images I1, I2 and I3 contains data of normal operation, abnormal operation or sparse data. Hence, within an earlier stage of operation of the technical system a significant higher number of images are available for training suitable AI- or ML-systems or the like.

Overall, the present invention relates to a computer-implemented method of converting time series data of at least one operational data source of a technical system into an image, the method comprising the steps of: a) providing a time series data for successive points time of an operational data source of the technical system, wherein the values of the time series data are varying over time. For providing an improved method for the analyzation of data time series that enables an easy and fast analysis, it is proposed that the method further comprise the steps of b) assigning for each of the considered time stamps of the respective time series data either a value-depending colour, a value-depending brightness, a value-depending pattern or a combination thereof to an image element, and c) sequencing the image elements along a timeline, preferably without spaces between the image elements, to form a set of linearly arranged image elements of the image.

It should be noted that the term "comprising" does not exclude other elements or steps and "a" or "an" does not exclude a plurality. Also, elements described in association with different embodiments may be combined. It should also be noted that reference signs in the claims should not be construed as limiting the scope of the claims.

Although the invention is illustrated and described in detail by the preferred embodiments, the invention is not limited by the examples disclosed, and other variations can be derived therefrom by a person skilled in the art without departing from the scope of the invention.

The invention claimed is:
1. A computer-implemented method of converting time series data provided by operational data sources of a gas turbine into an image, the method comprising:
   a) providing a plurality of time series data of a plurality of operational data sources of the gas turbine as a series of values of successive time stamps, with the plurality of time series data being provided as raw data directly from the plurality of operational data sources, and wherein the values of the series of values vary over time,
   b) assigning for each of the considered time stamps of the respective time series data either a value-depending color, a value-depending brightness, a value-depending pattern, or a combination thereof to an image element of the image, and
   c) sequencing the image elements along a timeline to form for each time series data a set of linearly arranged image elements of the image, with the image elements containing information about the values of operational parameters as provided by the operational data sources,
   wherein for each of the pluralities of time series data an assignment according to step b) and a sequencing according to step c) is performed, such, that for each provided time series data a set of linearly arranged set of image elements is formed,
   stacking the sets of linearly arranged image elements to provide a 2D arrangement, with all values of operational parameters from the plurality of operational data sources recorded at a same time step being positioned in a same horizontal position without any offset,
   after the b) assigning and c) sequencing, analyzing the image or a difference image generated from a comparison of the image with a second image to determine an abnormal or erroneous operational status of the gas turbine during operation, by any one or more methods from the group comprising neural networks, machine learning methods, deep learning methods, and image artificial intelligence algorithm,
   wherein the gas turbine is stationary and is part of a power plant for generating electrical energy by an electrical generator coupled to the gas turbine.

2. The method according to claim 1,
   wherein the image is arranged within a cartesian coordination system, in such a way, that the sets are arranged parallel to an X-axis of a cartesian coordination system and the sets are stacked along a Y-axis next to each other.

3. The method according to claim 2,
wherein the sets are arranged without any spaces and/or offset.

4. The method according to claim 1,
wherein at least one operational data source representing one of the operational parameters is or was read by a sensor,
wherein the operational parameter represents a position of a valve, a drive or a moveable element, a fraction of an element or a molecule in a gaseous or liquid medium, a pressure of a medium, a temperature of a medium, a humidity of a medium, a flow rate of a medium, or a voltage or an electrical current of the gas turbine.

5. The method according to claim 4,
wherein the sensor is generating the time series data continuously or stepwise.

6. The method according to claim 1,
wherein, when a color or a brightness is assigned to the image element, each image element comprises multiple pixels arranged in form of a square or rectangle or one pixel, or when a pattern is assigned to the image element, each image element comprises multiple pixels arranged in form of a square or rectangle.

7. The method according to claim 1,
wherein the method is applied for identifying the condition monitoring of various types of engines, for estimating quality in process industries, for anomaly detection in industrial assets, for forecasting of failures, for trend deviations, or for cyber security.

8. A data processing apparatus, comprising:
means for carrying out the method according to claim 1.

9. A computer program product stored on a non-transitory computer readable medium, comprising:
instructions which, when the program is executed by a computer, cause the computer to carry out the method according to claim 1.

10. A non-transitory computer-readable storage medium, comprising:
instructions which, when executed by a computer, cause the computer to carry out the method according to claim 1.

11. The method according to claim 1,
wherein the sequencing of the image elements along the timeline is without spaces between the image elements.

12. The method according to claim 1,
wherein all considered sets are arranged within the image next to each other, without spaces therebetween and without offset.

* * * * *